United States Patent
Li et al.

(10) Patent No.: US 9,264,916 B2
(45) Date of Patent: Feb. 16, 2016

(54) REDUCING IN-DEVICE INTERFERENCE BETWEEN MULTIPLE WIRELESS COMMUNICATIONS OF A MULTI-MODE MOBILE DEVICE

(75) Inventors: Yan Li, Beijing (CN); Lu Gao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 13/577,907

(22) PCT Filed: Feb. 23, 2011

(86) PCT No.: PCT/CN2011/071183
§ 371 (c)(1),
(2), (4) Date: Nov. 7, 2012

(87) PCT Pub. No.: WO2011/113317
PCT Pub. Date: Sep. 22, 2011

(65) Prior Publication Data
US 2013/0107867 A1 May 2, 2013

(30) Foreign Application Priority Data
Mar. 17, 2010 (WO) ................ PCT/CN2010/071103
Mar. 30, 2010 (WO) ................ PCT/CN2010/071417

(51) Int. Cl.
*H04W 24/02* (2009.01)
*H04B 1/00* (2006.01)
*H04B 1/04* (2006.01)
*H04B 1/10* (2006.01)
*H04W 76/06* (2009.01)
*H04W 72/12* (2009.01)
(Continued)

(52) U.S. Cl.
CPC ............... *H04W 24/02* (2013.01); *H04B 1/005* (2013.01); *H04B 1/0475* (2013.01); *H04B 1/109* (2013.01); *H04W 72/1215* (2013.01); *H04W 76/06* (2013.01); *H04W 16/14* (2013.01); *H04W 72/1284* (2013.01); *H04W 88/06* (2013.01); *Y02B 60/50* (2013.01)

(58) Field of Classification Search
None
See application file for complete search history.

(56) References Cited

U.S. PATENT DOCUMENTS 5,533,099 A 7/1996 Byrne
7,630,719 B2 * 12/2009 Bender et al. ................. 455/450

(Continued)

FOREIGN PATENT DOCUMENTS

CN 1383636 A 12/2002
CN 1459165 A 11/2003
(Continued)

OTHER PUBLICATIONS

Attar et al., "Evolution of CDMA2000 Cellular Networks: Multi-carrier EV-DO," IEEE Communications Magazine, Feb. 2006, pp. 1-7.*

(Continued)

*Primary Examiner* — Donald Mills
(74) *Attorney, Agent, or Firm* — Joseph Hanasz

(57) ABSTRACT

A particular method includes predicting, by a mobile device, that interference may occur during one or more specified time slots of a set of upcoming scheduled time slots of a wireless communication channel. The method also includes sending a message to a network device instructing the network device to prevent sending information to the mobile device during the one or more specified time slots.

34 Claims, 8 Drawing Sheets

(51) Int. Cl.
*H04W 16/14* (2009.01)
*H04W 88/06* (2009.01)

(56) References Cited

U.S. PATENT DOCUMENTS

| | | | |
|---|---|---|---|
| 8,179,833 B2 | 5/2012 | Attar et al. | |
| 2001/0023189 A1 | 9/2001 | Kajimura | |
| 2003/0108005 A1 | 6/2003 | Agrawal et al. | |
| 2004/0176039 A1 | 9/2004 | Leyh et al. | |
| 2005/0003836 A1 | 1/2005 | Inoue et al. | |
| 2005/0233704 A1 | 10/2005 | Maekawa | |
| 2007/0060060 A1* | 3/2007 | Qian | 455/63.1 |
| 2007/0097931 A1 | 5/2007 | Parekh et al. | |
| 2007/0121535 A1 | 5/2007 | Chen et al. | |
| 2008/0020769 A1 | 1/2008 | Parekh et al. | |
| 2008/0089397 A1 | 4/2008 | Vetter et al. | |
| 2008/0107074 A1* | 5/2008 | Salmenkaita et al. | 370/330 |
| 2008/0253352 A1 | 10/2008 | Thoukydides et al. | |
| 2009/0010228 A1* | 1/2009 | Wang et al. | 370/335 |
| 2009/0010242 A1* | 1/2009 | Leung et al. | 370/345 |
| 2009/0028115 A1 | 1/2009 | Hirsch | |
| 2009/0104905 A1 | 4/2009 | DiGirolamo et al. | |
| 2009/0131054 A1 | 5/2009 | Zhang | |
| 2009/0141689 A1 | 6/2009 | Parekh et al. | |
| 2009/0186577 A1 | 7/2009 | Ross et al. | |
| 2009/0276303 A1 | 11/2009 | Singhal | |
| 2009/0279511 A1 | 11/2009 | Zhu | |
| 2009/0323598 A1 | 12/2009 | Stamoulis et al. | |
| 2010/0056136 A1* | 3/2010 | Zhu | 455/426.1 |
| 2010/0061326 A1* | 3/2010 | Lee et al. | 370/329 |
| 2010/0113055 A1 | 5/2010 | Iwamura et al. | |
| 2010/0267410 A1 | 10/2010 | Chin et al. | |
| 2011/0064048 A1 | 3/2011 | Oguchi | |
| 2011/0097998 A1* | 4/2011 | Ko et al. | 455/41.2 |
| 2011/0110251 A1* | 5/2011 | Krishnamurthy et al. | 370/252 |
| 2012/0008559 A1* | 1/2012 | Leung et al. | 370/328 |
| 2012/0190362 A1 | 7/2012 | Subbarayudu et al. | |
| 2012/0214523 A1* | 8/2012 | Senarath et al. | 455/501 |
| 2013/0231147 A1 | 9/2013 | Li et al. | |

FOREIGN PATENT DOCUMENTS

| | | |
|---|---|---|
| CN | 101047954 A | 10/2007 |
| CN | 101051998 A | 10/2007 |
| CN | 101262674 A | 9/2008 |
| CN | 101529729 A | 9/2009 |
| CN | 101610578 A | 12/2009 |
| CN | 102369776 A | 3/2012 |
| EP | 2051551 A2 | 4/2009 |
| JP | 2004343356 A | 12/2004 |
| JP | 2008263582 A | 10/2008 |
| JP | 2009519665 A | 5/2009 |
| JP | 2010041162 A | 2/2010 |
| JP | 2011519521 A | 7/2011 |
| KR | 20020000414 A | 1/2002 |
| WO | 0201761 A1 | 1/2002 |
| WO | 2007069210 A2 | 6/2007 |
| WO | 2008048827 A1 | 4/2008 |
| WO | 2009127276 A1 | 10/2009 |
| WO | 2011116533 A1 | 9/2011 |

OTHER PUBLICATIONS

Supplementary European Search Report—EP11755634—Search Authority—Munich—Oct. 21, 2013.
International Search Report and Written Opinion—PCT/CN2011/071183—ISA/EPO—Jun. 2, 2011.
Qualcomm Europe: "Scheduling of measurements in LTE", 3GPP Draft; R2-060987, 3rd Generation Partnership Project (3GPP), Mobile Competence Centre ; 650, Route Des Lucioles ; F-06921 Sophia-Antipolis Cedex ; France, vol. RAN WG2, no. Athens, Greece; XP050130916, [retrieved on Mar. 23, 2006].
Qualcomm Europe (Email Rapporteur): Email discussion summary: [62_LTE_CO2] Home eNB inbound mobility support: Remaining issues, 3GPP Draft; R2-083569, 3rd Generation Partnership Project (3GPP), Mobile Competence Centre ; 650, Route Des Lucioles ; F-06921 Sophia-Antipolis Cedex ; France, vol. RAN WG2, no. Warsaw, Poland; XP050140939, [retrieved on Jun. 24, 2008].
Qualcomm Europe: "Measurement gap scheduling", 3GPP Draft; R2-060058, 3rd Generation Partnership Project (3GPP), Mobile Competence Centre ; 650, Route Des Lucioles ; F-06921 Sophia-Antipolis Cedex ; France, vol. RAN WG2, no. Sophia Antipolis, France; XP050130222, [retrieved on Jan. 5, 2006].
Qualcomm Europe: "Qualcomm proposal for E-UTRAN Architecture and Protocols" 3GPP Draft; R2-052921, SRD Generation Partnership Project (3GPP), Mobile Competence Centre ; 650, Route Des Lucioles ; F-06921 Sophia-Antipolis Cedex; France, vol. 1, no. Seoul,Korea;Nov. 11, 2005, XP050130142.
Qualcomm Europe (Rapporteur):[67#25] UMTS: Inbound mobility, 3GPP Draft; R2-095977-[67#25] UMTS Inbound Mobility, 3rd Generation Partnership Project (3GPP), Mobile Competence Centre ; 650, Route Des Lucioles ; F-06921 Sophia-Antipolis Cedex ; France, no. Miyazaki; XP050390401, [retrieved on Oct. 9, 2009].

\* cited by examiner

REDUCING IN-DEVICE INTERFERENCE BETWEEN MULTIPLE WIRELESS COMMUNICATIONS OF A MULTI-MODE MOBILE DEVICE

CLAIM OF PRIORITY

The present application claims priority from International Patent Application No. PCT/CN2010/071417, entitled "Apparatus and Method for Interference Mitigation" and filed Mar. 30, 2010, and from International Patent Application No. PCT/CN2010/071103, entitled "Apparatus and Method for Interference Mitigation" and filed Mar. 17, 2010, the contents of both of which are expressly incorporated by reference herein.

BACKGROUND

1. Field

The present disclosure relates to wireless communication networks.

2. Background

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

Some wireless telephones may communicate with multiple wireless communication networks. However, transmission of data to one of the wireless communication networks may interfere with reception of data from another of the wireless communication networks. The interference may degrade performance at the wireless telephone (e.g. due to packet loss at the wireless telephone), causing retransmission of lost packets. The retransmission of the lost packets may also consume network resources (e.g. time and frequency resources).

SUMMARY

A wireless telephone or other mobile device may support simultaneous operation of multiple transceivers. For example, a first transceiver of the mobile device may communicate with a Global System for Mobile Communications (GSM) network and a second transceiver of the mobile device may communicate with a High Rate Packet Data (HRPD) network. The GSM network and the HRPD network may be associated with separate frequency bands (e.g. adjacent frequency bands).

In some cases, simultaneous communication on multiple networks may cause interference at the mobile device, even though each of the multiple networks is associated with a separate frequency band. For example, a GSM transmission may interfere with receiving a preamble of a packet of an HRPD reception. Improper reception of the preamble may cause the mobile device to drop the entire packet, thus increasing packet error rate (PER). Antenna isolation or isolation by filters may be used to remove noise or jamming caused by the GSM transmission from the HRPD reception, but these techniques may add additional components and complexity to the mobile device.

Therefore, to reduce interference between the GSM transmission and the HRPD reception, the mobile device may send a message to a network device instructing the network device to prevent sending information to the mobile device during one or more specified time slots when interference is predicted to occur by the mobile device. The network device may analyze the message to determine how network resources (e.g. upcoming scheduled time slots) should be allocated.

In a particular embodiment, a method of operating a mobile device includes predicting, by the mobile device, that interference may occur during one or more specified time slots of a set of upcoming scheduled time slots of a wireless communication channel and sending a message to a network device instructing the network device to prevent sending information to the mobile device during the one or more specified time slots.

In another particular embodiment, an apparatus includes a processor including a scheduler configured to determine that the interference from a transmission of a mobile device may occur during one or more specified time slots of a set of upcoming scheduled time slots of a wireless communication channel. The processor further includes a message generator configured to receive data from the scheduler that indicates the one or more specified time slots and further configured to encode the received data into a message.

In another particular embodiment, a method includes receiving, by a network device, a message from a mobile device instructing the network device that the mobile device indicates mobile device transmission interference during one or more specified time slots of a set of upcoming scheduled time slots of a wireless communication channel.

In another particular embodiment, an apparatus includes a receiver that receives a message from a mobile device. The message includes multiple bits, where each of the bits has a bit position corresponding to a time slot of a set of upcoming scheduled time slots. Each of the bits also has a bit value indicating whether to prevent sending information to the mobile device during the corresponding time slot. The apparatus further includes a transmitter configured to transmit the information in specified time slots to the mobile device in response to the received message. For example, the apparatus may be a network device, such as an access node.

One particular advantage provided by at least one of the disclosed embodiments is improved allocation of network resources. For example, a network device may reassign upcoming scheduled time slots during which interference is predicted by a first mobile device to a second mobile device, resulting in better allocation of network resources and improved performance at the first mobile device.

Other aspects, advantages, and features of the present disclosure will become apparent after review of the entire application, including the following sections: Brief Description of the Drawings, Detailed Description, and the Claims.

DETAILED DESCRIPTION

Figure 1:
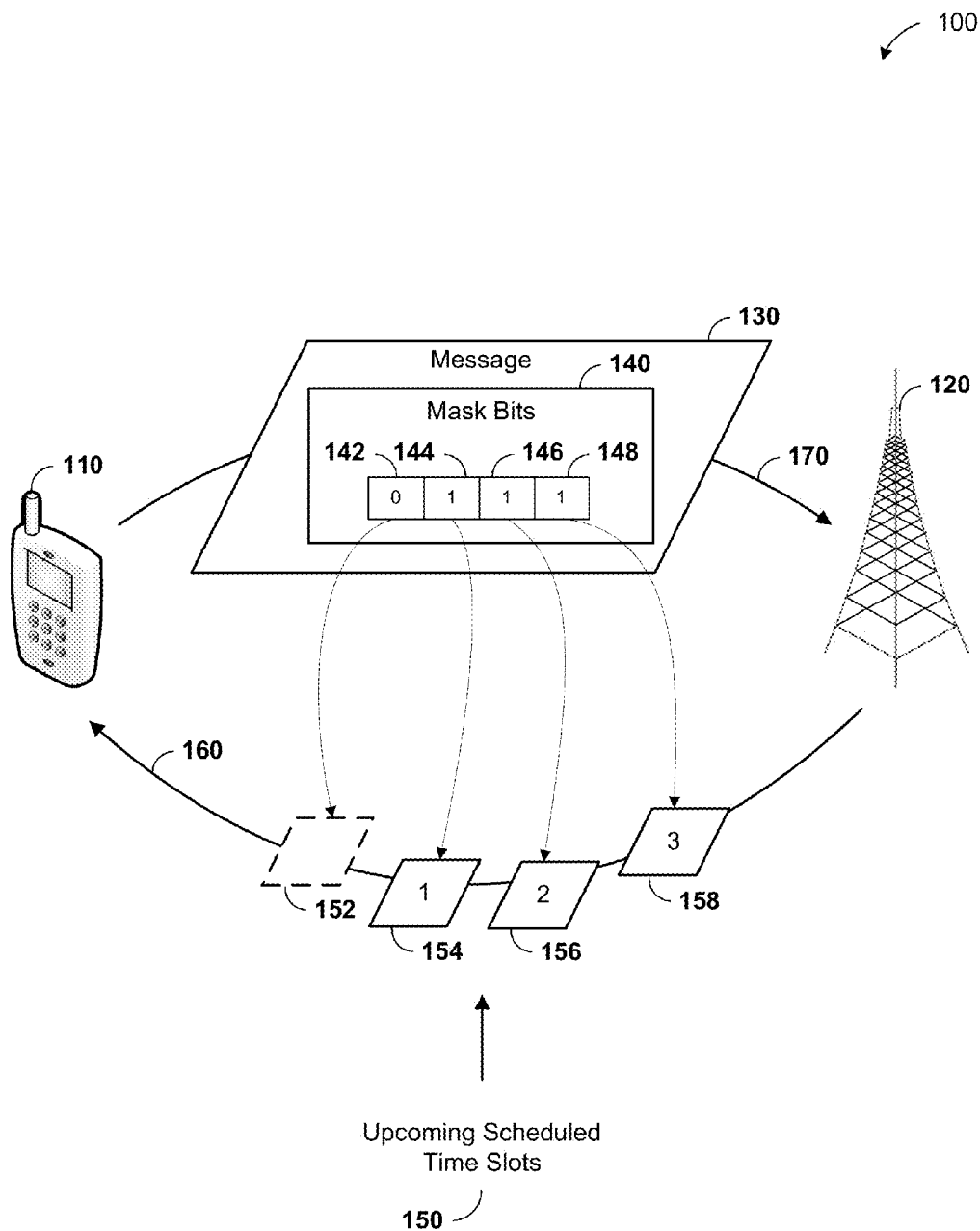
FIG. 1 is a diagram to illustrate a particular embodiment of a network to communicate a message instructing a network device to prevent sending information during a set of upcoming scheduled time slots.

Referring to FIG. 1, a particular illustrative embodiment of a network 100 is shown and generally designated 100. The network 100 may include a network device 120 (e.g. an access node) configured to communicate using a wireless communication channel with one or more mobile devices, such as a mobile device 110 (e.g. an access terminal).

The wireless communication channel may include a downlink 160 and an uplink 170. The network device 120 may use the downlink 160 to transmit data and other signals to the mobile device 110. Similarly, the mobile device 110 may use the uplink 170 to transmit data and other signals to the network device 120. In general, the network 100 may support any number of mobile devices and may include multiple network devices and wireless communication channels. For example, the network 100 may include multiple network devices each corresponding to a different geographic location (e.g. a cell).

The downlink 160 of the wireless communication channel may be associated with a set 150 of upcoming scheduled time slots during which data may be sent from the network device 120 to the mobile device 110 over the wireless communication channel. For example, the set 150 of upcoming scheduled time slots may include a first time slot 152, a second time slot 154, a third time slot 156, and a fourth time slot 158.

The uplink 170 of the wireless communication channel may be used by the mobile device 110 to transmit a message 130. The message 130 may instruct the network device 120 to prevent sending information to the mobile device 110 during one or more specified time slots of the set 150 of upcoming scheduled time slots. For example, the message 130 may include mask bits 140 (e.g. a pattern of mask bits) that indicate the one or more specified time slots of the set 150 of upcoming scheduled time slots during which the network device 120 should not send information to the mobile device 110 in order to avoid potential interference due to transmission by the mobile device 110.

The mask bits 140 may include multiple bits. For example, the mask bits 140 may include a first bit 142, a second bit 144, a third bit 146, and a fourth bit 148. Each of the bits may have a bit position corresponding to one of the upcoming scheduled time slots 152-158. For example, as shown in FIG. 1, the first bit 142 has a bit position corresponding to the first time slot 152, the second bit 144 has a bit position corresponding to the second time slot 154, the third bit 146 has a bit position corresponding to the third time slot 156, and the fourth bit 148 has a bit position corresponding to the fourth time slot 158. According to a particular embodiment, an order of the bit positions may be reversed. For example, the fourth bit 148 may correspond to the first time slot 152 instead of the fourth time slot 158, since FIG. 1 depicts that the network device 120 may receive the fourth bit 148 before receiving the other bits 142-146 and may therefore schedule the first time slot 152 before scheduling the other time slots 154-158.

Each of the multiple bits 142-148 may have a bit value indicating whether the network device 120 should prevent information from being sent during one of the upcoming scheduled time slots. For example, as shown in FIG. 1, the first bit 142 has a bit value of "0" indicating that information should not be sent from the network device 120 to the mobile device 110 during the first time slot 152 (i.e. that interference is predicted at the mobile device 110 during the first time slot 152). FIG. 1 further shows that the second bit 144, the third bit 146, and the fourth bit 148 each have a bit value of "1" indicating that information may be sent from the network device 120 to the mobile device 110 during the second time slot 154, during the third time slot 156, and during the fourth time slot 158, respectively. In general, the mask bits 140 may have any number of "1"s and any number of "0"s (e.g. each time slot of the set 150 of upcoming scheduled time slots may be masked according to the mask bits 140).

According to a particular embodiment, the mask bits 140 are a DRC mask that is transmitted to the network device 120 concurrently with a data rate control (DRC) value. The DRC value is explained in more detail with reference to FIG. 3. In a particular embodiment, the DRC mask is configurable to be one, two, four, or eight bits.

In operation, the mobile device 110 may predict that one or more specified time slots of the set of upcoming scheduled time slots of the wireless communication channel may experience interference (e.g. frequency overlap) due to transmissions made by the mobile device 110 to a second network device (e.g. a second access node or other electronic device). According to a particular illustrative embodiment, a scheduler of the mobile device 110 may predict that interference will occur by comparing an upcoming non-scheduled Global System for Mobile Communications (GSM) transmission and an upcoming scheduled High Rate Packet Data (HRPD) reception. For example, the mobile device 110 may be a dual HRPD/GSM mobile device operable to communicate with HRPD and GSM networks concurrently. According to further embodiments, interference may be predicted between an upcoming scheduled transmission and an upcoming scheduled reception. For example, interference may be predicted between a Bluetooth or wireless local area network (WLAN) transmission and a Long Term Evolution (LTE) or High Speed Packet Access (HSPA) reception. In general, interference may be predicted due to scheduled or non-scheduled upcoming transmissions so long as the scheduler of the mobile device 110 can predict that the transmission will cause a collision or interference.

In response to predicting that interference may occur, the mobile device 110 may transmit the message 130 to the network device 120 instructing the network device 120 to prevent sending information to the mobile device 110 during the one or more specified time slots (e.g. one or more time slots associated with predicted mobile transmission interference). For example, FIG. 1 shows the message 130 including the mask bits 140 indicating that information should be prevented from being sent by the network device 120 to the mobile device 110 during the first time slot 152. Accordingly, if the network device 120 is scheduled to transmit information to the mobile device 110 during the first time slot 152, the network device 120 may prevent (e.g. delay) information from being sent until the second time slot 154, the third time slot 156, and the fourth time slot 158.

It will be appreciated that the network 100 of FIG. 1 may reduce interference at the mobile device 110. For example, by preventing information from being sent to the mobile device 110 during the first time slot 152, interference between information received from the network device 120 and a transmission by the mobile device 110 of other data to a second network device may be reduced. In particular, if the network device 120 prevents (e.g. delays) sending information that includes a preamble until the second time slot 154, a preamble collision (e.g. between receiving a beginning of a packet and a concurrent transmission by the mobile device 110 to another network device) may be prevented, thus avoiding a dropped packet and an accompanying increase in packet error rate (PER) at the mobile device 110. Illustrative implementations of transmitting a message that indicates interference is predicted to occur in upcoming time slots are described further with respect to FIG. 3, FIG. 4, and FIG. 5.

Figure 2:
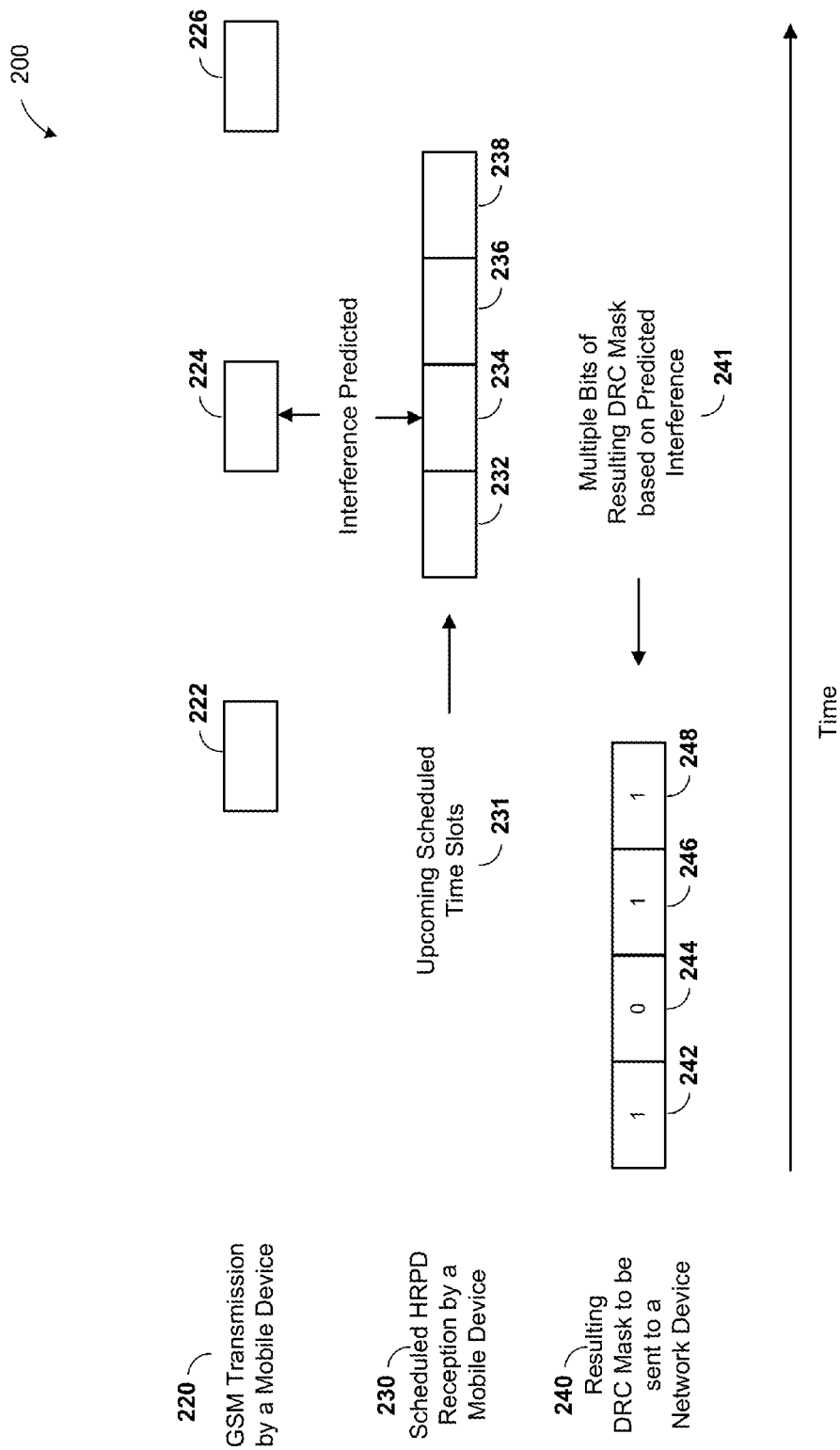
FIG. 2 is a timing diagram to illustrate a particular embodiment of operation of the network of FIG. 1.

Referring to FIG. 2, a particular illustrative embodiment of a timing diagram associated with operation of a mobile device is shown and is generally designated 200. The timing diagram 200 may correspond to operation of the mobile device 110 of FIG. 1.

The timing diagram 200 generally depicts states of a Global System for Mobile Communications (GSM) transmission 220 by the mobile device to a GSM network device, a scheduled High Rate Packet Data (HRPD) reception 230 by the mobile device from an HRPD network device, and a data rate control (DRC) mask 240 to be sent by the mobile device to the HRPD network device. It should be appreciated that the GSM transmission 220 and the scheduled HRPD reception 230 could generally be any type of transmission and reception and are not limited to GSM and HRPD. For example, the transmission may be a Bluetooth transmission or a wireless local area network (WLAN) transmission and the reception may be a Long Term Evolution (LTE) reception or a High Speed Packet Access (HSPA) reception.

The GSM transmission 220 may include multiple predetermined time intervals. For example, the GSM transmission 220 may include a first transmission time interval 222, a second transmission time interval 224, and a third transmission time interval 226 during which information is to be transmitted from the mobile device to the GSM network device.

The scheduled HRPD reception 230 may include a set 231 of upcoming scheduled time slots (e.g. time slots of a downlink of a wireless communication channel from the HRPD network device to the mobile device). For example, the scheduled HRPD reception 230 may include a first time slot 232, a second time slot 234, a third time slot 236, and a fourth time slot 238. According to a particular embodiment, the set 231 of upcoming scheduled time slots may correspond to the set 150 of upcoming scheduled time slots of FIG. 1.

The mobile device may determine that the GSM transmission 220 may interfere with reception of information from the HRPD network device during a set of time slots. For example, FIG. 2 depicts that the second transmission time interval 224 is likely to interfere (e.g. cause mobile device transmission interference) with reception of information from the HRPD network device during the second time slot 234.

In response to determining that the GSM transmission 220 may interfere with the reception of information from the HRPD network device during the second time slot 234, the mobile device may generate a message (e.g. the DRC mask 240) to be sent to the HRPD network device. The message may indicate to the HRPD network device that the mobile device indicates mobile device transmission interference for one or more specified time slots (e.g. the second time slot 234).

The DRC mask 240 may include multiple bits 241. Each of the multiple bits 241 of the DRC mask 240 may have a bit position corresponding to one of the set 231 of upcoming scheduled time slots. For example, the multiple bits 241 may include a first bit 242 that has a bit position corresponding to the first time slot 232, a second bit 244 that has a bit position corresponding to the second time slot 234, a third bit 246 that has a bit position corresponding to the third time slot 236, and a fourth bit 248 that has a bit position corresponding to the fourth time slot 238.

The multiple bits 241 of the DRC mask 240 may each include a bit value that indicates predicted interference and may indicate whether information should be prevented from being sent from the HRPD network device to the mobile device during the scheduled corresponding time slot. FIG. 2 shows that the second bit 244 has a bit value of "0" indicating that the network device should prevent sending information to the mobile device during the second time slot 234. The bit value of "0" is set since the mobile device predicts interference due to transmission by the mobile device during the second time slot 234. Further, FIG. 2 shows that the first bit 242 has a bit value of "1" indicating that the network device should not prevent information from being sent to the mobile device during the first time slot 232. Similarly, FIG. 2 shows that the third bit 246 and the fourth bit 248 each have a bit value of "1" indicating that the network device can send information to the mobile device during the third time slot 236 and during the fourth time slot 238, respectively. It will be appreciated that in an alternate embodiment, a bit value of "1" may indicate to prevent sending information and a bit value of "0" may indicate not to prevent sending information.

As will be appreciated, a mobile device operating in accordance with the timing diagram 200 of FIG. 2 may avoid reception of signals from the HRPD network device during time slots when interference is predicted to occur. By avoiding such communications, the mobile device may operate without use of physical interference mitigation techniques such as antenna isolation, which may be impractical given mobile device size constraints. The mobile device may further operate without isolation by filters that may typically increase device complexity (e.g. by adding hardware or software to filter out signals associated with the GSM transmission 220 from the scheduled HRPD reception 230).

Figure 3:
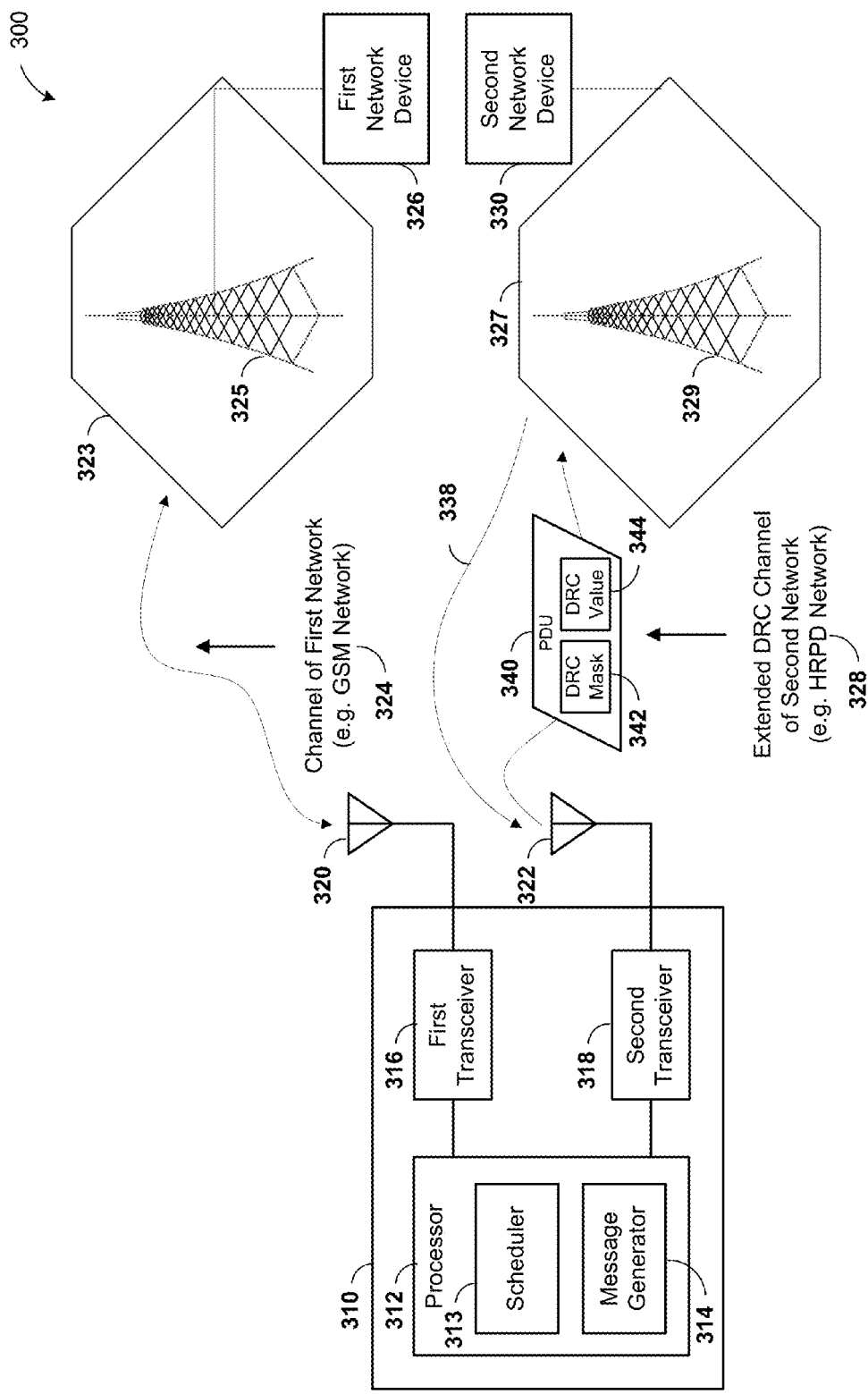
FIG. 3 is a diagram to illustrate another particular embodiment of a network to communicate a message instructing a network device to prevent sending information during a set of upcoming scheduled time slots.

Referring to FIG. 3, a particular illustrative embodiment of a representative mobile device 310 and a communication system 300 is shown. In a particular illustrative embodiment, the mobile device 310 and the communication system 300 of FIG. 3 include features similar to those of the network 100 of FIG. 1 and may operate as described with reference to the timing diagram 200 of FIG. 2.

The communication system 300 may include a channel 324 of a first network (e.g. a GSM network) that includes a first base station 325 corresponding to a first cell 323. The first base station 325 may be in communication with a first network device 326 (e.g. an access node). The first network device 326 may be located at or may be distinct from the first base station 325. The first network device 326 may include portions of the first network that receive and process messages (e.g. calls) from mobile devices.

The communication system 300 may further include a second network. The second network may be a High Rate Packet Data (HRPD) network that includes a second base station 329 corresponding to a second cell 327. The second base station 329 may be in communication with a second network device 330 (e.g. an access node). The second network device 330 may be located at or may be distinct from the second base station 329. The second network device 330 may include portions of the second network that receive and process messages (e.g. calls) from mobile devices.

The second network may include an extended data rate control (DRC) channel 328 (e.g. a control channel in a set of uplink channels) and a downlink data channel 338 (e.g. a channel that bears data sent from the second base station 329 to the mobile device 310). Although not illustrated in FIG. 3, the second network may include other channels. For example, an uplink data channel may be provided that bears data sent from the mobile device 310 to the second network device 330 via the second base station 329. The second network may further include a downlink control channel that bears control data sent from the second network device 330 via the base station 329 to the mobile device 310.

The mobile device 310 (e.g. an access terminal) may include a processor 312, a first transceiver 316, a first antenna 320, a second transceiver 318, and a second antenna 322. The processor 312 may include a scheduler 313 and a message generator 314. As used herein, "transceiver" may include a single transceiver or a receiver/transmitter pair.

The mobile device 310 may be configured to communicate using the first transceiver 316 and the second transceiver 318. For example, the mobile device 310 may communicate with the first network device 326 using the first transceiver 316 and the first antenna 320. As another example, the mobile device 310 may communicate with the second network device 330 using the second transceiver 318 and the second antenna 322.

The mobile device 310 may communicate with the first network device 326 and with the second network device 330 using wireless communication channels. For example, the mobile device 310 may communicate with the first network device 326 using the channel 324 of the first network. As another example, the mobile device 310 may communicate control data to the second network device 330 using the extended DRC channel 328 of the second network.

The extended DRC channel 328 may be configured to transmit a DRC value 344 from the mobile device 310 to the second network device 330. The DRC value 344 may indicate a requested data rate at which data is to be sent from the second network device 330 to the mobile device 310 (e.g. a number of slots used to transmit each upcoming data packet to the mobile device 310). A network may also define a DRC length. For example, DRC values may be transmitted according to a periodicity defined by the DRC length may be adjusted by the mobile device 310 in response to changing channel conditions. For example, the DRC value 344 may indicate a higher requested data rate in response to favorable channel conditions and may indicate a lower requested data rate in response to unfavorable channel conditions. As another example, the DRC value 344 may be transmitted more often (e.g. have a shorter length) in response to more dynamic channel conditions and may be transmitted less often (e.g. have a longer length) in response to more stable channel conditions and to mitigate uplink interference.

The extended DRC channel 328 may be further configured to transmit a data rate control (DRC) mask 342 (e.g. the mask bits 140 of FIG. 1 or the DRC mask 240 of FIG. 2) from the mobile device 310 to the second network device 330. In a particular illustrative embodiment, the extended DRC channel 328 may be configured to transmit a protocol data unit 340 that includes the DRC value 344 and the DRC mask 342. The DRC mask 342 may be transmitted concurrently with the DRC value 344. In a particular illustrative embodiment, the DRC mask 342 may include multiple bits, each of the bits having a bit position corresponding to one of the upcoming scheduled time slots and further having a bit value indicating that information should be prevented from being sent during the corresponding time slot.

In operation, the processor 312 may determine that interference may occur during one or more specified time slots of a set of upcoming scheduled time slots of a wireless communication channel (e.g. between a transmission from the first transceiver 316 to the first network device 326 and a reception of information at the second transceiver 318 from the second network device 330). In particular, the scheduler 313 may compare the set of upcoming scheduled time slots to upcoming time intervals during which data is to be transmitted to the first network device 326 using the first transceiver 316 and the first antenna 320. If the scheduler 313 determines that interference may occur between one or more specified time slots of the set of upcoming scheduled time slots and the transmission of data to the first network device 326, the message generator 314 may generate a message to be transmitted by the mobile device 310 to the second network device 330 using the second antenna 322 and the second transceiver 318. The message may be sent from the mobile device 310 to the second network device 330 instructing the second network device 330 that the mobile device 310 indicates mobile device transmission interference during one or more time slots of a set of upcoming scheduled time slots.

In response to receiving the message, the second network device 330 may prevent (e.g. delay) sending information to the mobile device 310 during the specified time slots. The second network device 330 may send information to the mobile device 310 (e.g. via the downlink data channel 338) during time slots when interference is not predicted.

As will be appreciated, the embodiment of FIG. 3 may reduce interference between communication of information between a mobile device and a plurality of network devices. The reduction in interference may provide more efficient use of network resources (e.g. by allowing a network device to reassign time slots during which interference is predicted). Further, the embodiment of FIG. 3 may enable efficient use of system resources by allowing transmission of a message using existing system resources.

As will be further appreciated, the embodiment of FIG. 3 takes advantage of the feature that a DRC length may be associated with a requested number of upcoming scheduled time slots. Because the DRC length generally indicates a number of requested upcoming scheduled time slots until a next DRC value is transmitted, it will be appreciated that multiple DRC mask bits may be transmitted concurrently with the DRC value indicating whether information may be sent during the requested upcoming scheduled time slots. The process may generally be repeated for each successive DRC value transmitted from the mobile device 310.

Figure 4:
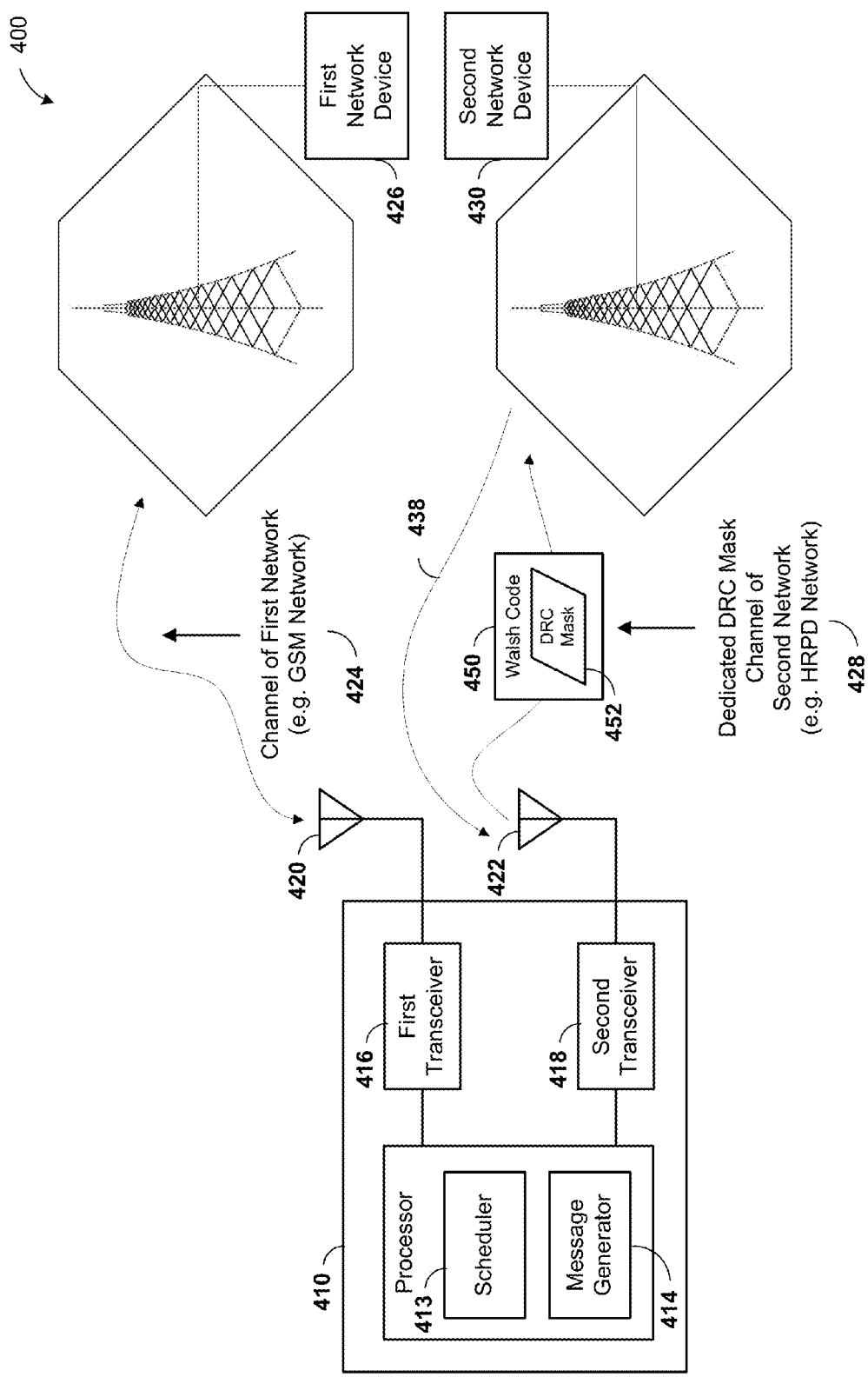
FIG. 4 is a diagram to illustrate another particular embodiment of a network to communicate a message instructing a network device to prevent sending information during a set of upcoming scheduled time slots.

Referring to FIG. 4, a particular illustrative embodiment of a mobile device 410 and a communication system 400 is shown. The mobile device 410 and the communication system 400 may include components similar to components of the mobile device 310 and the communication system 300 of FIG. 3. For example, a mobile device 410, a first network device 426, and a second network device 430 of FIG. 4 may operate similarly to the mobile device 310, the first network device 326, and the second network device 330, respectively, of FIG. 3.

The mobile device 410 may communicate with the first network device 426 using a channel 424 of a first network (e.g. a GSM network). The mobile device 410 may further communicate with the second network device 430 using a dedicated DRC mask channel 428 of a second network (e.g. an HRPD network). The dedicated DRC mask channel 428 may be a dedicated channel (e.g. the dedicated DRC mask channel 428 may be dedicated to transmitting messages to network devices regarding predicted interference). The dedicated DRC mask channel 428 may be used by the mobile device 410 to transmit control information (e.g. information regarding predicted interference) to the second network device 430. The second network device 430 may use a downlink data channel (e.g. a downlink data channel 438 of FIG. 4) to transmit data to the mobile device 410.

FIG. 4 describes means for determining (e.g. a scheduler 413) that interference may occur during one or more specified time slots of upcoming scheduled time slots of a wireless communication channel and means for encoding data into a message (e.g. a message generator 414) indicating the one or more specified time slots. FIG. 4 further describes means for transmitting (e.g. a first transceiver 416) GSM data and means for receiving (e.g. a second transceiver 418) HRPD data.

In operation, the scheduler 413 of the mobile device 410 may predict that interference may occur due to a transmission by the mobile device 410 to the first network device 426 and a reception of information from the second network device 430 during one or more time slots. For example, the scheduler 413 may determine that interference may occur during one or more specified time slots of a set of upcoming scheduled time slots. In response to predicting the interference, the message generator 414 may generate a message 450 to be sent to the second network device 430 instructing the second network device 430 to prevent sending information to the mobile device 410 during the one or more specified time slots of the set of the upcoming scheduled time slots.

The message 450 may be sent to the second network device 430 using a dedicated channel, such as the dedicated DRC mask channel 428 of the second network of FIG. 4. The dedicated DRC mask channel 428 may be a physical channel. The dedicated DRC mask channel 428 may be associated with a unique Walsh code that is used to encode data to be sent via the dedicated DRC mask channel 428. For example, the Walsh code may be orthogonal to other codes used to encode other data to be sent using other channels of the second network.

The message 450 may include a data rate control (DRC) mask 452 (e.g. a pattern of mask bits) that includes multiple bits, each of the bits having a bit position corresponding to one of the upcoming scheduled time slots and having a bit value indicating that information should be prevented from being sent to the mobile device 410 during scheduled corresponding time slot. In a particular illustrative embodiment, the dedicated DRC mask channel 428 transmits one bit in each uplink time slot.

The second network device 430 may receive the message 450 and determine whether to prevent sending information to the mobile device 410 in the one or more specified time slots. The second network device 430 may use non-specified time slots of the set of upcoming scheduled time slots to transmit information to the mobile device 410 (e.g. using the downlink data channel 438).

Figure 5:
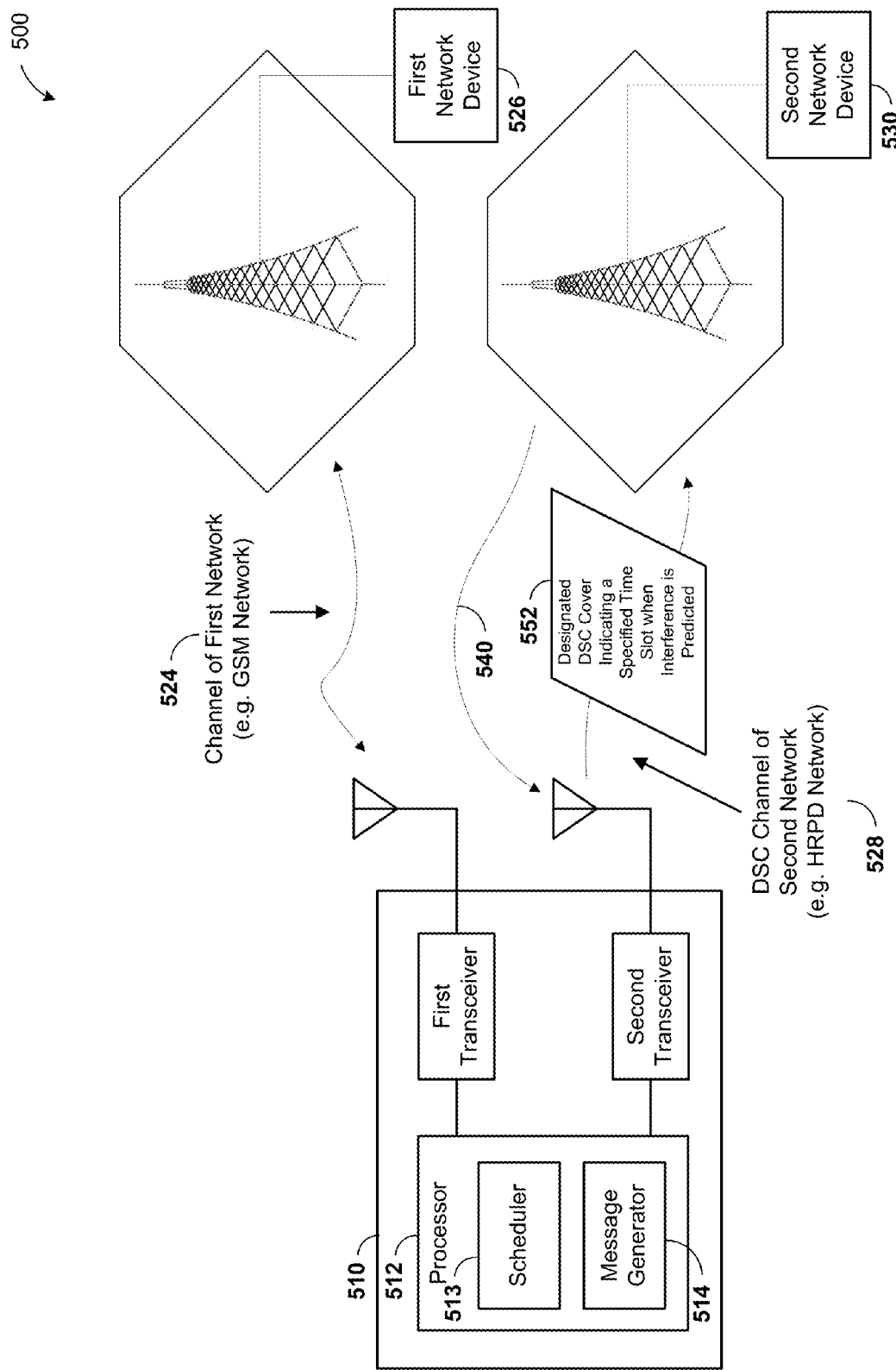
FIG. 5 is a diagram to illustrate another particular embodiment of a network to communicate a message instructing a network device to prevent sending information during a set of upcoming scheduled time slots.

Referring to FIG. 5, a particular illustrative embodiment of a mobile device 510 and a communication system 500 is shown. The mobile device 510 and the communication system 500 may include components similar to components of the mobile device 310 and the communication system 300 of FIG. 3, the mobile device 410 and the communication system 400 of FIG. 4, or a combination thereof. For example, the mobile device 510 may operate as described with reference to the mobile device 310 of FIG. 3 or the mobile device 410 of FIG. 4. As another example, the communication system 500 may include a first network device 526 that operates as described with reference to the first network device 326 of FIG. 3 or the first network device 426 of FIG. 4. The communication system 500 may further include a second network device 530 that operates as described with reference to the second network device 330 of FIG. 3 or the second network device 430 of FIG. 4.

The mobile device 510 may communicate with the first network device 526 using a channel 524 of a first network (e.g. a GSM network). The mobile device 510 may communicate with the second network device 530 using a data source control (DSC) channel 528 that carries DSC covers and using a downlink data channel 540 that conveys data from the second network device 530 to the mobile device 510. The DSC channel 528, other uplink control and data channels, and the downlink data channel 540 may be included in a second network (e.g. an HRPD network).

The DSC channel 528 may convey DSC covers indicating other network devices (e.g. to indicate an upcoming handoff of a wireless telephone call). In a particular illustrative embodiment, the DSC covers include up to eight DSC covers corresponding to eight network devices with which the mobile device 510 may be in communication. The DSC covers may be Walsh codes (e.g. orthogonal codes).

The DSC covers may include a designated DSC cover that indicates that interference is predicted during a corresponding upcoming time slot. For example, FIG. 5 shows a designated DSC cover 552 indicating a specified time slot when interference is predicted (e.g. a next upcoming time slot after a time slot during which the DSC cover 552 is transmitted). If the mobile device 510 transmits the designated DSC cover 552 (e.g. via the DSC channel 528) to the second network device 530, the second network device 530 may prevent data from being transmitted to the mobile device 510 in the corresponding upcoming time slot. If the mobile device 510 transmits DSC covers other than the designated DSC cover 552 (e.g. via the DSC channel 528) to the network device 530, upcoming time slots corresponding to the other DSC covers may be used for normal downlink data transmission from the second network device 530 to the mobile device 510 (e.g. using the downlink data channel 540).

In operation, a scheduler 513 of a processor 512 of the mobile device 510 may predict that interference may occur due to transmissions from the mobile device 510 during one or more specified time slots of a set of upcoming scheduled time slots associated with the second network. In response to the predicted interference, a message generator 514 of the processor 512 may generate a message to be sent to the second network device 530 instructing the second network device 530 to prevent sending information to the mobile device 510 during the one or more specified time slots. In a particular illustrative embodiment, the message may be transmitted to the second network device 530 via the DSC channel 528. The message may be the designated DSC cover 552 of FIG. 5 and may indicate a specified time slot when interference is predicted.

The network device 530 may receive the message and analyze (e.g. decode) the received message to determine whether to prevent sending information to the mobile device 510 during the one or more specified time slots when interference is predicted. The network device 530 may then use other time slots of the set of upcoming scheduled time slots (when interference is not predicted) to transmit information to the mobile device 510 (e.g. using the downlink data channel 540).

As will be appreciated, the embodiment of FIG. 5 may enable reduced interference caused by concurrent transmissions and receptions of data at a mobile device. In particular, the embodiment of FIG. 5 may utilize a designated DSC cover to indicate a specified time slot when interference is predicted. The designated DSC cover may be an unused DSC cover of a set of DSC covers, since a mobile device may use fewer than all available DSC covers (e.g. the mobile device may be in communication with fewer than eight network devices).

Figure 6:
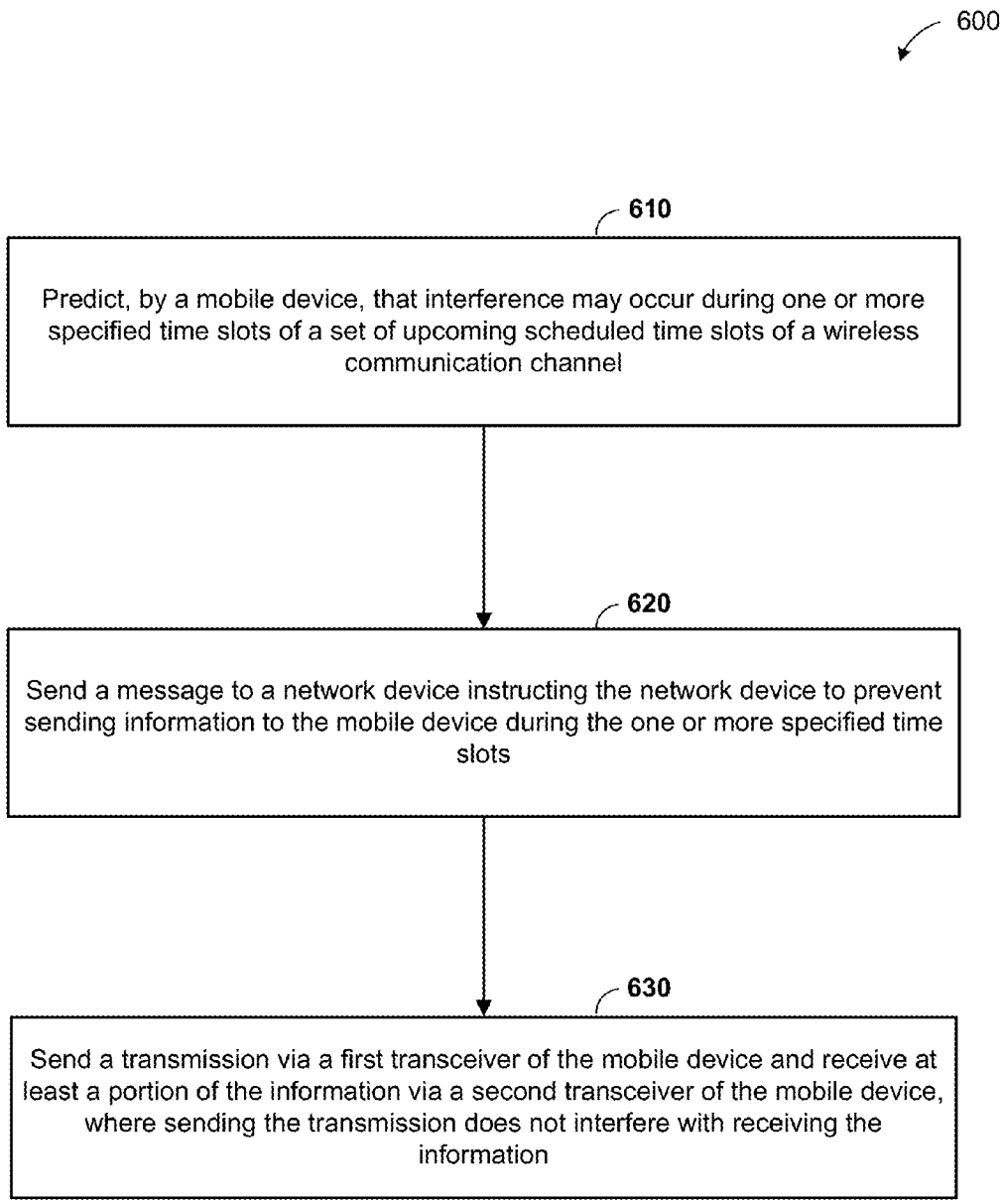
FIG. 6 is a flow diagram to illustrate a particular embodiment of a method of instructing a network device to prevent sending information during a set of upcoming scheduled time slots.

Referring to FIG. 6, a particular illustrative embodiment of a method of instructing a network device to prevent sending information to a mobile device during a set of upcoming scheduled time slots is shown and is generally designated 600. The method 600 may be performed by the mobile device 110 of FIG. 1, by the mobile device 310 of FIG. 3, by the mobile device 410 of FIG. 4, and by the mobile device 510 of FIG. 5.

The method 600 includes predicting, by the mobile device, that interference may occur during one or more specified time slots of a wireless communication channel, at 610. According to a particular illustrative embodiment, the interference is predicted based on a transmission to be sent by the mobile device (e.g. to a first network) that may interfere with a reception of information (e.g. from a second network) by the mobile device. For example, the transmission may be a GSM transmission and the reception may be an HRPD reception. The one or more specified time slots may be scheduled HRPD time slots during which HRPD data is to be received by the mobile device. According to further embodiments, the transmission may be a Bluetooth transmission or a wireless local area network (WLAN) transmission and the reception may be a Long Term Evolution (LTE) reception or a High Speed Packet Access (HSPA) reception.

The method 600 further includes sending a message to a network device instructing the network device to prevent sending information to the mobile device during the one or more specified time slots, at 620. The network device may be the network device 120 of FIG. 1, the second network device 330 of FIG. 3, the second network device 430 of FIG. 4, or the second network device 530 of FIG. 5. The message may be the message 130 of FIG. 1, the DRC mask 240 of FIG. 2, the PDU 340 of FIG. 3, the message 450 of FIG. 4, or the designated DSC cover 552 of FIG. 5.

The method 600 may further include sending a transmission via a first transceiver of the mobile device and receiving information via a second transceiver of the mobile device, where sending the transmission does not interfere with receiving the information, at 630. For example, the network device may reschedule (e.g. delay) sending information to the mobile device until time slots when interference is not predicted, thus avoiding interference. According to a particular illustrative embodiment, if the network device sends information to the mobile terminal in the one or more specified time slots when interference is predicted, the interfered signal (e.g. interference between pilot or media access channel (MAC) symbols and data channel symbols) may be erased at the mobile device. According to another particular illustrative embodiment, a receiver of the mobile device is powered down during the specified time slots when interference is predicted.

Figure 7:
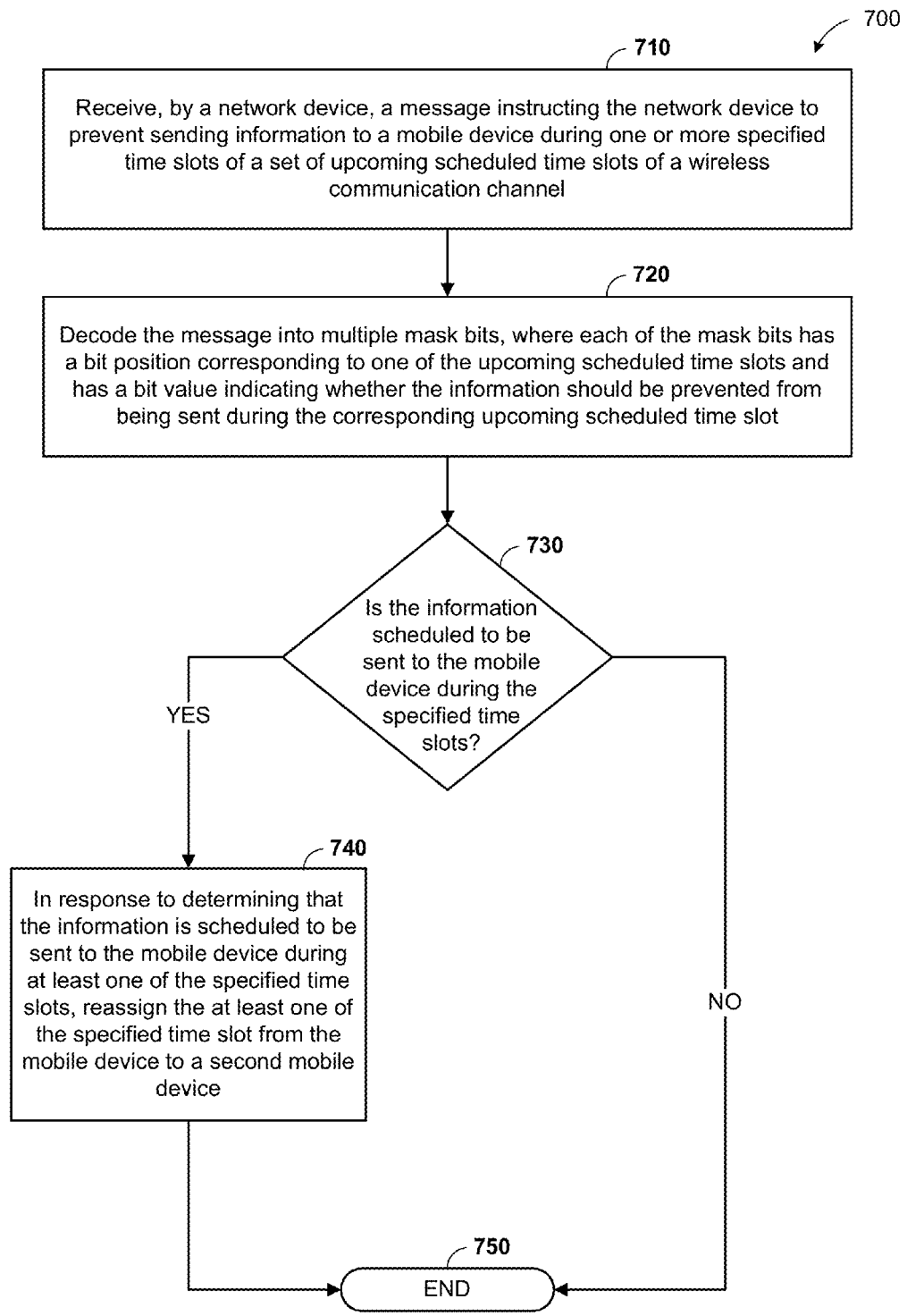
FIG. 7 is a flow diagram to illustrate a particular embodiment of a method of a network device receiving a message instructing the network device to prevent sending information during a set of upcoming scheduled time slots.

Referring to FIG. 7, a particular illustrative embodiment of a method of a network device receiving a message instructing the network device to prevent sending information during a set of upcoming scheduled time slots is shown and is generally designated 700. The method 700 may be implemented by the network device 120 of FIG. 1, the second network device 330 of FIG. 3, the second network device 430 of FIG. 4, and the second network device 530 of FIG. 5.

The method 700 includes receiving, by a network device, a message instructing the network device to prevent sending information to a mobile device during one or more specified time slots of a set of upcoming scheduled time slots of a wireless communication channel, at 710. In a particular illustrative embodiment, the mobile device may be the mobile device 110 of FIG. 1, the mobile device 310 of FIG. 3, the mobile device 410 of FIG. 4, or the mobile device 510 of FIG. 5.

The method 700 may further include decoding the message into multiple mask bits, where each of the mask bits has a bit position corresponding to one of the upcoming scheduled time slots and has a bit value indicating whether information should be prevented from being sent during one of the upcoming scheduled time slots, at 720. In a particular illustrative embodiment, the message may be the message 130 of FIG. 1, the PDU 340 of FIG. 3, the message 450 of FIG. 4, or the designated DSC cover 552 of FIG. 5.

The method 700 may further include determining whether information is to be scheduled to be sent to the mobile device during the one or more specified time slots, at 730. If it is determined that information is not scheduled to be sent to the mobile device during the one or more specified time slots (i.e. the time slots corresponding to predicted interference due to transmission by the mobile device), the method terminates, at 750. If it is determined that information is scheduled to be sent to the mobile device during the one or more specified time slots, at least one of the one or more specified time slots may be reassigned from the mobile device to a second mobile device, at 740. Reassigning the at least one of the one or more time slots to a second mobile device may reduce a likelihood of transmission interference at the mobile device (e.g. causing packet loss). The method 700 terminates, at 750.

Figure 8:
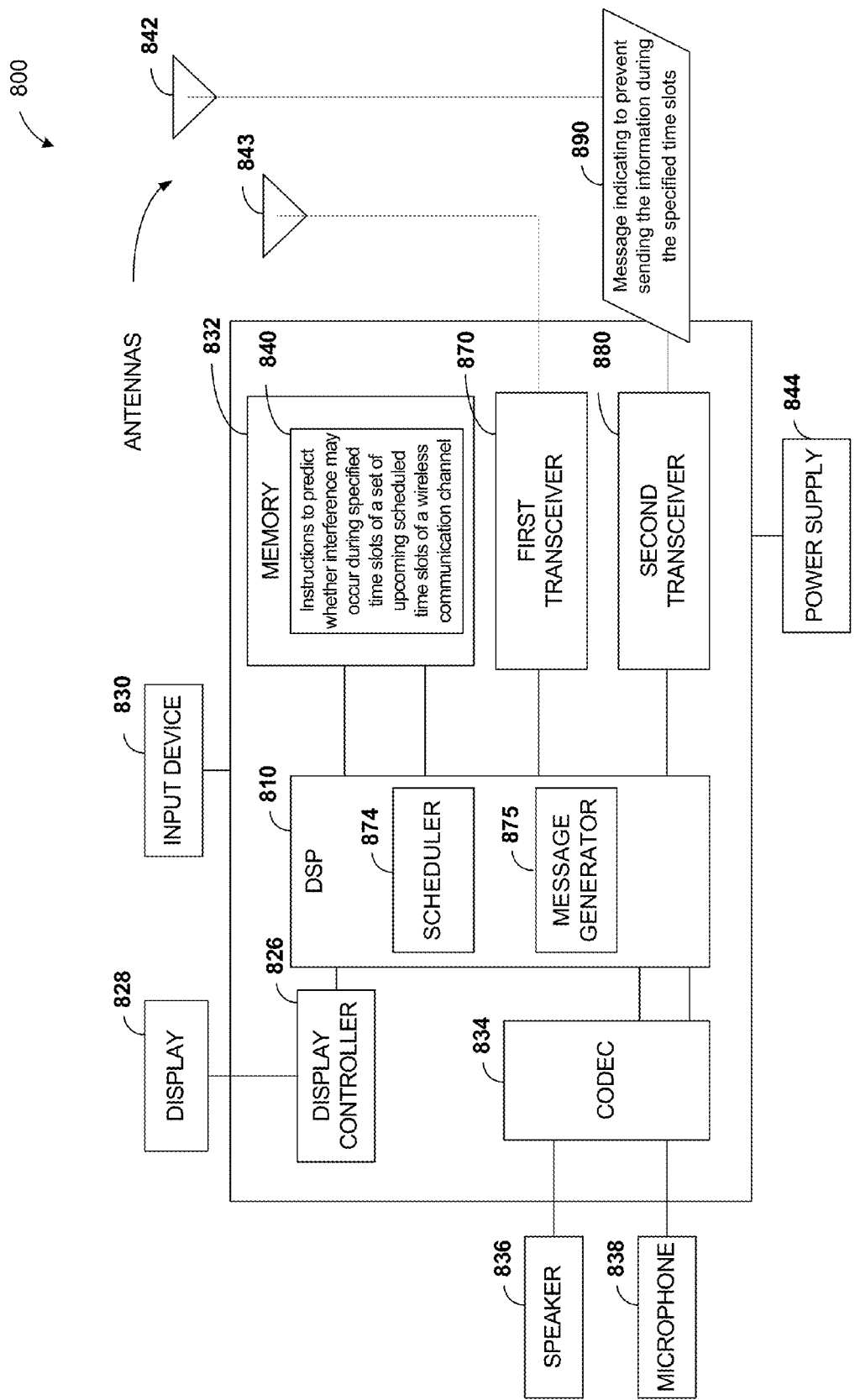
FIG. 8 is a block diagram of a mobile device that supports sending a message instructing a network device to prevent sending information during a set of upcoming scheduled time slots.

Referring to FIG. 8, a block diagram of a mobile device that supports sending a message instructing a network device to prevent sending information to the mobile device during a set of upcoming scheduled time slots is shown and generally designated 800. In one embodiment, the mobile device 800 or components thereof include or are included within the mobile device 110 of FIG. 1, the mobile device 310 of FIG. 3, the mobile device 410 of FIG. 4, the mobile device 510 of FIG. 5, or a combination thereof. All or part of the method 600 described in FIG. 6 may be performed at or by the mobile device 800. Further, the mobile device 800 may operate in accordance with the timing diagram 200 of FIG. 2 (e.g. the mobile device 800 may predict interference based on upcoming scheduled transmissions and receptions).

The mobile device 800 includes a processor, such as a digital signal processor (DSP) 810, including a scheduler 874 and a message generator 875. In the embodiment illustrated in FIG. 8, the mobile device 800 further includes a first transceiver 870 and a first antenna 843. The first transceiver 870 and the first antenna 843 may be associated with a particular network (e.g. a GSM network).

The DSP 810 may be coupled to a memory 832 that includes instructions 840. The memory 832 may be a non-transitory (e.g. tangible) computer-readable storage medium that stores the instructions 840.

The instructions 840 may be executable by the DSP 810 to perform one or more functions or methods described herein. For example, the instructions 840 may be operable, when executed by the DSP 810, to predict whether interference may occur during particular time slots of the set of upcoming scheduled time slots of a wireless communication channel (e.g. an HRPD channel). In a particular illustrative embodiment, the scheduler 874 compares upcoming scheduled time intervals associated with a GSM transmission to the set of upcoming scheduled time slots of a scheduled HRPD reception to determine the particular time slots during which interference is predicted to occur.

The instructions 840 may be further executed by the DSP 810 to generate a message 890 to inform a network device about predicted interference during the one or more specified time slots of the set of upcoming scheduled time slots of the wireless communication channel. According to a particular illustrative embodiment, the message generator 875 generates the message 890 and a second transceiver 880 sends the message 890 using a second antenna 842.

FIG. 8 also shows a display controller 826 that is coupled to the digital signal processor 810 and to a display 828. A coder/decoder (CODEC) 834 may also be coupled to the digital signal processor 810. A speaker 836 and a microphone 838 may be coupled to the CODEC 834. A power supply 844 and an input device 830 may be further provided.

In a particular embodiment, one or more components or corresponding components of the mobile device 800 of FIG. 8 may be included in a network device (e.g. a network-side base station). For example, the network device may include means for receiving (e.g. a transceiver, similar to the first transceiver 870 or the second transceiver 880, and an antenna) a message from a mobile device, wherein the message indicates that the network device should prevent sending information to the mobile device during particular time slots of a set of upcoming scheduled time slots of a wireless communication channel. The network device may further include means for transmitting (e.g. a transceiver, similar to the first transceiver 870 or the second transceiver 880, and an antenna) information to the mobile device in response to the received message. The network device may further include a processor (e.g. similar to the DSP 810) to execute instructions causing the processor to decode and process the received message to determine that information should be prevented from being sent to the mobile device.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method, comprising:
   predicting, by a mobile device, that interference may occur while receiving information at the mobile device via a first network during one or more specified time slots of a set of upcoming scheduled time slots due to a scheduled transmission from the mobile device via a second network; and
   sending a message to a network device to notify the network device of the one or more specified time slots during which the predicted interference may occur;
   wherein the message comprises a pattern of mask bits, wherein each of the mask bits has a bit position corresponding to one or more of the upcoming scheduled time slots, wherein the mask bits include at least one bit value indicating that data should be prevented, based on the predicted interference, from being sent to the mobile device via the first network during at least one of the upcoming scheduled time slots.

2. The method of claim 1, wherein a data rate control (DRC) mask that includes the mask bits is sent to the network device via an extended DRC channel of a wireless communication channel.

3. The method of claim 2, wherein the message includes the DRC mask and a DRC value indicating a requested data rate at which data is to be sent from the network device to the mobile device.

4. The method of claim 3, wherein the message is a protocol data unit (PDU) that includes the DRC mask and the DRC value.

5. The method of claim 1, wherein the message is sent to the network device via a dedicated data rate control (DRC) mask channel of a wireless communication channel.

6. The method of claim 5, wherein the dedicated DRC mask channel is associated with a unique Walsh code.

7. The method of claim 1, wherein the message is sent to the network device via a data source control (DSC) channel of a wireless communication channel.

8. The method of claim 7, wherein the DSC channel is configured to carry a set of DSC covers.

9. The method of claim 8, wherein a designated DSC cover of the set of DSC covers indicates the one or more specified time slots of the set of upcoming scheduled time slots during which the predicted interference may occur.

10. The method of claim 9, wherein the set of DSC covers is a set of eight Walsh codes.

11. The method of claim 1, further comprising:
sending, via the second network, data associated with the scheduled transmission via a second transceiver of the mobile device; and
receiving, via the first network, at least a portion of the information via a first transceiver of the mobile device, wherein sending the data associated with the scheduled transmission via the second network does not interfere with receiving the information via the first network.

12. The method of claim 11, wherein the scheduled transmission is a Global System for Mobile Communications (GSM) transmission, and wherein the reception is a High Rate Packet Data (HRPD) reception that is scheduled to occur concurrently with the GSM transmission.

13. The method of claim 12, wherein the one or more specified time slots are scheduled HRPD time slots during which HRPD data is to be received by the mobile device.

14. The method of claim 11, wherein the scheduled transmission is a Bluetooth transmission or a wireless local area network (WLAN) transmission and wherein the reception is a Long Term Evolution (LTE) reception or a High Speed Packet Access (HSPA) reception.

15. An apparatus, comprising:
a processor configured to determine that interference may occur while receiving information at a mobile device via a first network during one or more specified time slots of a set of upcoming scheduled time slots due to a scheduled transmission from the mobile device via a second network; and
a transmitter configured to transmit a message to a network device to notify the network device of the one or more scheduled time slots during which the interference may occur;
wherein the message comprises a pattern of mask bits, wherein each of the mask bits has a bit position corresponding to one or more of the upcoming scheduled time slots, wherein the mask bits include at least one bit value indicating that data should be prevented, based on the predicted interference, from being sent to the mobile device via the first network during at least one of the upcoming scheduled time slots.

16. The apparatus of claim 15, wherein the message is generated by a message generator and the one or more time scheduled time slots are encoded in the message as a data rate control (DRC) mask.

17. The apparatus of claim 16, further comprising:
a first transceiver configured to transmit and receive Global System for Mobile Communications (GSM) data to a GSM network device; and
a second transceiver configured to transmit and receive High Rate Packet Data (HRPD) data from an HRPD network device, wherein the HRPD network device includes the network device.

18. The apparatus of claim 17, integrated into a dual HRPD/GSM mobile device.

19. An apparatus, comprising:
means for determining that interference may occur while receiving information at a mobile device via a first network during one or more specified time slots of upcoming scheduled time slots due to a scheduled transmission from the mobile device via a second network; and
means for sending a message to a network device to notify the network device of the one or more specified time slots during which the interference may occur;
wherein the message comprises a pattern of mask bits, wherein each of the mask bits has a bit position corresponding to one or more of the upcoming scheduled time slots, wherein the mask bits include at least one bit value indicating that data should be prevented, based on the predicted interference, from being sent to the mobile device via the first network during at least one of the upcoming scheduled time slots.

20. The apparatus of claim 19, further comprising:
means for transmitting and receiving Global System for Mobile Communications (GSM) data; and
means for transmitting and receiving High Rate Packet Data (HRPD) data,
wherein the one or more specified time slots are HRPD time slots during which the GSM data is to be transmitted.

21. A non-transitory computer readable medium including instructions operable, when executed by a processor, to cause the processor to:
predict, by a mobile device, that interference may occur while receiving information at the mobile device via a first network during one or more specified time slots of a set of upcoming scheduled time slots due to a scheduled transmission from the mobile device via a second network; and
send a message to a network device to notify the network device of the one or more specified time slots during which the predicted interference may occur;
wherein the message comprises a pattern of mask bits, wherein each of the mask bits has a bit position corresponding to one or more of the upcoming scheduled time slots, wherein the mask bits include at least one bit value indicating that data should be prevented, based on the predicted interference, from being sent to the mobile device via the first network during at least one of the upcoming scheduled time slots.

22. The non-transitory computer readable medium of claim 21, wherein the message includes a mask bit pattern that includes multiple bits, wherein each of the bits has a bit position corresponding to one of the upcoming scheduled time slots and has a bit value indicating whether data should be prevented from being sent to the mobile device via the first network during one of the one or more specified time slots.

23. The non-transitory computer readable medium of claim 22, wherein the instructions are further operable, when executed by the processor, to cause the processor to reference each bit of the mask bit pattern to determine, for each particular time slot of the set of upcoming scheduled time slots, whether the mobile device should receive data from the network device during each particular time slot.

24. A method, comprising:
receiving, by a network device, a message from a mobile device, the message indicating a likelihood of mobile device transmission interference occurring while the mobile device receives information via a first network during one or more specified time slots of a set of upcoming scheduled time slots due to a scheduled transmission from the mobile device via a second network, wherein the message comprises a pattern of mask bits, wherein each of the mask bits has a bit position corresponding to one or more of the upcoming scheduled time slots, wherein the mask bits include at least one bit value indicating that data should be prevented, based on the predicted interference, from being sent to the mobile device via the first network during at least one of the upcoming scheduled time slots; and refraining, in response to an instruction received in the message, from transmitting data to the mobile device during the one or more specified time slots.

25. The method of claim 24, further comprising determining whether the information is scheduled to be sent via the first network to the mobile device during the one or more specified time slots.

26. The method of claim 25, further comprising, in response to determining that the information is scheduled to be sent via the first network to the mobile device during the one or more specified time slots, reassigning the one or more specified time slots from the mobile device to a second mobile device.

27. An apparatus, comprising:
a receiver configured to receive a message from a mobile device, the message indicating a likelihood of mobile device transmission interference occurring while the mobile device receives information via a first network during one or more specified time slots of a set of upcoming scheduled time slots due to a scheduled transmission from the mobile device via a second network, wherein the message comprises a pattern of mask bits, wherein each of the mask bits has a bit position corresponding to one or more of the upcoming scheduled time slots, wherein the mask bits include at least one bit value indicating that data should be prevented, based on the predicted interference, from being sent to the mobile device via the first network during at least one of the upcoming scheduled time slots; and
a transmitter configured to selectively transmit data to the mobile device in certain time slots of the upcoming time slots based on the bit value of the bits corresponding to the certain time slots.

28. The apparatus of claim 27, wherein the message includes a data rate control (DRC) mask that includes the multiple bits, and wherein the message further includes a DRC value.

29. The apparatus of claim 27, wherein the message is received via a dedicated channel associated with a unique Walsh code.

30. The apparatus of claim 27, wherein the message includes a data source control (DSC) cover.

31. An apparatus, comprising:
means for receiving a message from a mobile device, the message indicating whether the mobile device is expected to experience interference while receiving information at the mobile device via a first network during one or more time slots of a set of upcoming scheduled time slots due to a scheduled transmission from the mobile device via a second network, wherein the message includes a mask bit pattern that includes multiple bits, wherein each of the bits corresponds to one or more of the upcoming scheduled time slots, wherein the bits include at least one bit value indicating that data should be prevented, based on the predicted interference, from being sent to the mobile device via the first network during at least one of the upcoming scheduled time slots; and
means for selectively transmitting data to the mobile device based on whether the mobile device is expected to experience interference during the one or more time slots.

32. The apparatus of claim 31, wherein each of the mask bits has a bit value indicating whether data should be prevented from being sent to the mobile device via the first network during one or more of the one or more specified time slots.

33. A non-transitory computer readable medium including instructions operable, when executed by a processor, to cause the processor to:
receive a message from a mobile device, the message indicating a likelihood of mobile device transmission interference occurring while the mobile device receives information via a first network during one or more specified time slots of a set of upcoming scheduled time slots due to a scheduled transmission from the mobile device via a second network, wherein the message comprises a pattern of mask bits, wherein each of the mask bits has a bit position corresponding to one or more of the upcoming scheduled time slots, wherein the mask bits include at least one bit value indicating that data should be prevented, based on the predicted interference, from being sent to the mobile device via the first network during at least one of the upcoming scheduled time slots; and
prevent sending data to the mobile device during one or more certain time slots when the bit value associated with the one or more certain time slots indicates that the mobile device is likely to experience interference during the one or more certain time slots.

34. The non-transitory computer readable medium of claim 33, wherein the instructions are further operable, when executed by the processor, to cause the processor to reassign at least one of the upcoming scheduled time slots from the mobile device to a second mobile device.

* * * * *